United States Patent
Duret et al.

(10) Patent No.: US 7,661,320 B2
(45) Date of Patent: Feb. 16, 2010

(54) DEFORMATION SENSOR BEARING COMPRISING AT LEAST THREE STRAIN GAUGES

(75) Inventors: Christophe Duret, Quintal (FR); Olivier Blanchin, Annecy (FR); Julien Lavoye, Echirolles (FR)

(73) Assignee: S.N.R. Roulements, Annecy (FR)

( * ) Notice: Subject to any disclaimer, the term of this patent is extended or adjusted under 35 U.S.C. 154(b) by 14 days.

(21) Appl. No.: 12/093,248

(22) PCT Filed: Nov. 7, 2006

(86) PCT No.: PCT/FR2006/002476

§ 371 (c)(1),
(2), (4) Date: Jul. 15, 2008

(87) PCT Pub. No.: WO2007/054639

PCT Pub. Date: May 18, 2007

(65) Prior Publication Data

US 2009/0044633 A1 Feb. 19, 2009

(30) Foreign Application Priority Data

Nov. 9, 2005 (FR) .................................. 05 53407

(51) Int. Cl.
*G01N 3/00* (2006.01)
(52) U.S. Cl. ..................... 73/795; 73/862.322
(58) Field of Classification Search ........... 73/760–860, 73/862.322
See application file for complete search history.

(56) References Cited

U.S. PATENT DOCUMENTS

| 4,116,075 | A  | * | 9/1978 | Ort .............................. 73/708 |
| 4,203,319 | A  |   | 5/1980 | Lechler |
| 4,705,969 | A  | * | 11/1987 | Gross ......................... 327/102 |
| 6,658,943 | B2 | * | 12/2003 | McDearmon ................ 73/795 |
| 6,687,623 | B2 | * | 2/2004 | Bailey et al. .................. 702/42 |
| 7,497,131 | B2 | * | 3/2009 | Sentoku ................. 73/862.322 |
| 2002/0057856 | A1 | * | 5/2002 | Bailey et al. ................. 384/448 |
| 2002/0194927 | A1 |   | 12/2002 | Yoshida et al. |
| 2008/0170817 | A1 | * | 7/2008 | McDearmon ............... 384/448 |
| 2009/0180722 | A1 | * | 7/2009 | Dougherty et al. .......... 384/448 |

FOREIGN PATENT DOCUMENTS

| DE | 100 41 093 A1 | 3/2002 |
| EP | 1 221 589 A2 | 7/2002 |

* cited by examiner

*Primary Examiner*—Max Noori
(74) *Attorney, Agent, or Firm*—Arent Fox LLP

(57) ABSTRACT

The invention relates to a bearing comprising at least one system for determining the amplitude A of the pseudo-sinusoidal deformations of an area of the fixed race that are induced during rotation, the said system comprising at least three strain gauges (7), a device for measuring three signals $V_i$ depending respectively on the temporal variations of the signal emitted by each gauge (8), the said device being able to form two signals SIN and COS respectively of like angle and like amplitude, and a device for calculating the amplitude A of the deformations of the area (7) as a function of time, the said device being designed to calculate the expression $SIN^2 + COS^2$ so as to deduce the amplitude A therefrom.

16 Claims, 3 Drawing Sheets

DEFORMATION SENSOR BEARING COMPRISING AT LEAST THREE STRAIN GAUGES

CROSS-REFERENCE TO RELATED APPLICATION

This application is a National Stage entry of international Application Number PCT/FR2006/002476, filed Nov. 7, 2006, and claims the priority of Application Number 0553407, filed Nov. 9, 2005, in France. The disclosures of the prior applications are hereby incorporated herein in their entirety by reference.

The invention relates to a bearing comprising a fixed race, a rotating race and at least a row of rolling bodies positioned in a raceway, which is formed between said races so as to allow their relative rotation.

It typically applies to wheel bearings of a motor vehicle, the fixed race being integral with the chassis of said vehicle and the wheel being associated with the rotating race.

When it is desired to know the stresses applied to the interface between the wheel and the road which said wheel rotates on, it is known to measure said stresses at the level of the tyre or at the level of the chassis. However, measuring at the level of the tyre induces important problems for transmitting the signal between the tyre rotating reference system and a calculation fixed reference system, with said rotating reference system in addition having to be permanently positioned with respect to said fixed reference system so as to be able to calculate. As regards the measurement at the level of the chassis, it is difficult because of the distribution of stresses among the various elements connecting the wheel to said chassis.

Consequently, as provided in the documents FR-2 839 553 and FR-2 812 356, the fixed race, which is the first connecting element between the wheel and the chassis, is more particularly used as a support for determining the stresses exerted at the interface between the wheel and the road when the vehicle is travelling.

More particularly, the determination of stresses can be carried out by measuring the deformations of the fixed race, which are induced by the passage of the rolling bodies. As a matter of fact, the amplitude of such deformations is representative of the stresses to be determined.

One of the existing problems with such a stresses determination strategy is that the deformation signal depends on the rotation speed. As a matter of fact, the quality of the low velocity measurement is not sufficient and the determination is available only after measuring the deformations induced by the passage of at least two successive rolling bodies.

Consequently, this problem is all the more critical since the measurement of the stresses must be carried out in real time or with a minimum delay, as is necessary for the systems controlling the vehicle dynamics as for example the ABS or the ESP.

The aim of the invention is more particularly to remedy such problems by providing a bearing comprising a system for determining the amplitude of the deformations of the fixed race, with said system being designed to carry out a spatial interpolation of the deformation signal so as to obtain, at any time and independently from the rotation speed, a measure of the deformations and thus to enable the determination of stresses.

For this purpose, according to a first embodiment, the invention provides a bearing comprising a fixed race, a rotating race and at least a row of rolling bodies positioned in a raceway which is formed between said races so as to enable their relative rotation, said rolling bodies being equally distributed in the raceway with an angular separation $\lambda$, said bearing comprising at least a system for determining the amplitude A of the pseudo-sinusoidal deformations of an area of the fixed race which are induced during rotation, wherein the determining system includes:

- three strain gauges, each delivering a signal depending on the deformation sustained by said gauge, with said gauges being equally distributed over said area with a spacing equal to $\lambda/4$;
- a device for measuring three signals $V_i$ which are respectively depending on the temporal variations of the signal emitted by each gauge during rotation, with said device being capable of forming, through a combination of the three signals $V_i$, two signals SIN and COS respectively of like angle and like amplitude, said amplitude depending on A;
- a device for calculating the amplitude A of the deformations of the area as a function of time, said device being designed to calculate the expression $SIN^2+COS^2$ so as to deduce A therefrom.

More particularly, the gauges are based on resistive elements so as to have each an electric resistance $R_i$ which varies depending on the deformations sustained by said gauge and the measuring device comprises a current loop connection between the three gauges, said connection comprising a first stage of three adjustable gain $G_i$ differential amplifiers.

In addition, the frequency domain analysis of the signal produced by a strain gauge positioned on the area of deformation of a bearing during rotation shows the presence of various interference signals. In particular, the signal induced by the passage of balls is disturbed at frequencies corresponding to the presence of rotation defects. A signal can thus be identified, having a frequency which is the double of that of the rotation which corresponds to an out-of-roundness defect of the rotating race, and a signal having the same frequency as that of the rotation which corresponds to an excentration defect of the rotating race.

According to an additional aspect, the invention aims at getting free from the presence of such interference signals so as to enhance the quality of the signal of the measurement of the amplitude of the pseudo-sinusoidal deformations of an area of the fixed race of a bearing which are induced during rotation.

For this purpose, according to a second embodiment complementary to the first one, the invention provides a bearing which includes a fourth strain gauge delivering a signal depending on the deformation sustained by said gauge, said gauge being spaced by a distance equal to $\lambda/4$ from one of the three other gauges, with the current loop connection comprising said fourth gauge and a fourth adjustable gain $G_i$ differential amplifier in the first stage to deliver four signals $V_i$ which respectively depend on the temporal variations of the signal emitted by each gauge during rotation, wherein the measuring device further comprises a second stage of differential amplifiers comprising three different amplifiers which are connected to have the differences $V_1-V_2$, $V_2-V_3$ and $V_4-V_3$, with at least a third stage of differential amplifiers being provided for delivering the signals SIN and COS through a combination of the three signals from the second stage.

According to a third embodiment complementary to the second one, the invention provides a bearing which includes a fifth strain gauge delivering a signal depending on the deformation sustained by said gauge, with said gauge being spaced by a distance equal to $\lambda/4$ from one of the four other gauges, the current loop connection comprising said fifth gauge and a fifth adjustable gain $G_i$ differential amplifier in the first stage for delivering five signals $V_i$ which are respectively depending on the temporal variations of the signal emitted by each gauge during rotation, wherein the measuring device further comprises a second stage of differential amplifiers comprising four differential amplifiers which are connected to have the differences $V_1-V_2$, $V_2-V_3$, $V_4-V_3$ and $V_5-V_4$, with at least a third stage of differential amplifiers being provided for delivering the signals SIN and COS through a combination of the four signals from the second stage.

In these last two embodiments, the measuring device may include a third and a fourth stages of differential amplifiers, with the third stage combining the signals from the second stage and the fourth stage combining the signals from the second and/or the third stages so as to deliver the signals SIN and COS.

According to a fourth embodiment complementary to the second one, the invention provides a bearing which includes three additional strain gauges delivering a signal depending on the deformation sustained by said gauge, with said additional gauges being interposed between the four other gauges so as to form a set of seven gauges equally distributed over the area with a spacing equal to $\lambda/8$, with the current loop connection comprising said set of gauges and seven adjustable gain $G_i$ differential amplifiers in the first stage for delivering seven signals $V_i$ respectively depending on the temporal variations of the signals emitted by each gauge during rotation, wherein the measuring device further comprises a second stage of differential amplifiers comprising six differential amplifiers (8) which are connected to have the differences $V_1-V_2$, $V_2-V_3$, $V_3-V_4$, $V_4-V_5$, $V_5-V_6$ and $V_6-V_7$, with at least a third stage of differential amplifiers being provided for delivering the signals SIN and COS through a combination of the six signals from the second stage.

In this embodiment, the measuring device may include a third, a fourth and a fifth stages of differential amplifiers, the third stage combining the signals from the second stage, the fourth stage combining the signals from the second and third stages and the fifth stage combining the signals from the fourth stage so as to deliver the signals SIN and COS.

Other objects and advantages of the invention will appear while reading the following description and referring to the appended drawings, wherein.

The invention relates to a bearing comprising a fixed race 1, a rotating race 2 and at least a row of rolling bodies positioned in a raceway, which is formed between said races so as to allow the relative rotation of said races.

The fixed race 1 is intended to be associated with a fixed structure and the rotating race is intended to be associated to a rotating element. In a particular application, the bearing is a bearing of a motor vehicle wheel, with the fixed structure being the chassis of said vehicle and the rotating element being the wheel.

Figure 1:
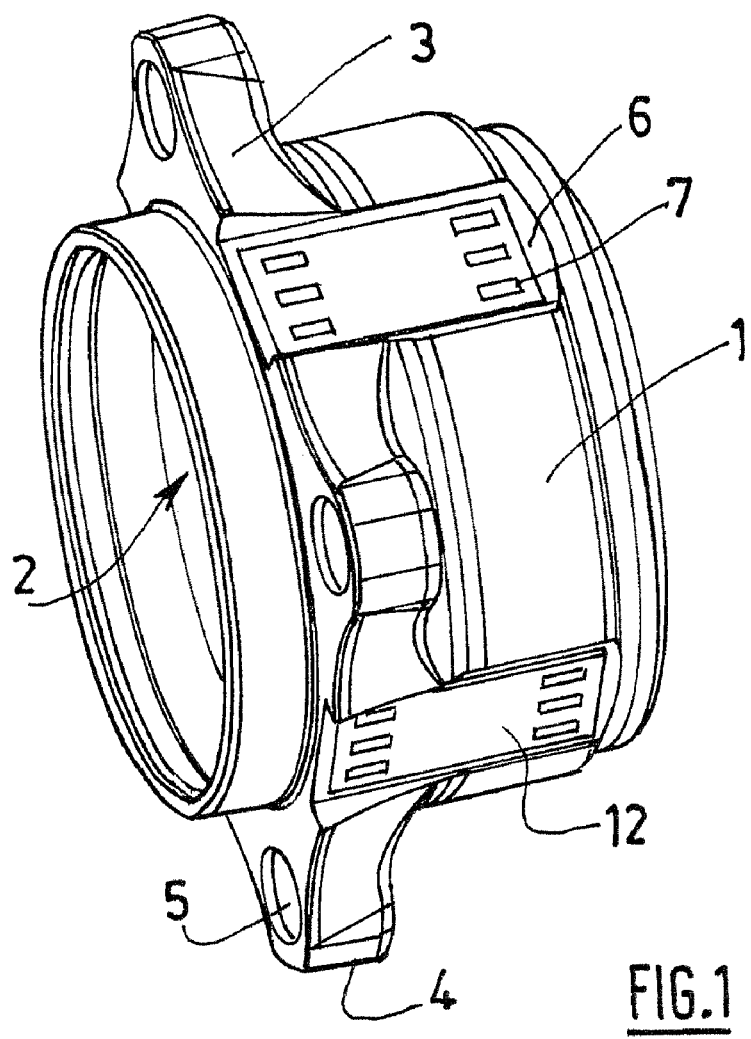
FIG. 1 is a perspective view of an embodiment of a bearing showing the gauges of four systems for determining the amplitude of the pseudo-sinusoidal deformations, said gauges being respectively positioned on an area of the fixed race.

While referring to FIG. 1, such a wheel bearing is described, as it includes two rows of balls, which are positioned co-axially in a raceway provided between the fixed outer race 1 and the rotating inner race 2, respectively. In addition, the fixed race 1 is provided with means for fastening same to the chassis, which are formed of a flange 3 comprising four radial protrusions 4 wherein an axial hole 5 is made to allow the fastening with a screw.

The balls are equally distributed in the raceway with an angular separation $\lambda$ which is also called a spatial period. According to a known embodiment, the separation between the balls is maintained by positioning same in a cage.

The invention aims at making it possible to determine the amplitude of the deformations of at least an area 6 of the fixed race 1, so as to be able to deduce therefrom the stresses, which are applied to the interface between the wheel and the road which said wheel rotates on.

As a matter of fact, the passage of the balls in the raceway induces a compression and a relaxation of the fixed race 1. Thus, during the rotation, the fixed race 1 is submitted to a periodical deformation, which can be approximated by a sine curve. In the following description, pseudo-sinusoidal deformations will be mentioned in reference to the deformations of the fixed race 1 during rotation.

The pseudo-sinusoidal deformation is characterised by an amplitude which depends on the loads sustained by the bearing and thus, the stresses which are applied at the interface and a frequency which is proportional to the rotation speed of the rotating race as well as the number of balls.

Although the description is made in relation with a wheel bearing comprising two rows of balls for which the amplitude of deformations is determined independently, such invention can be directly applied by persons skilled in the art to another type of bearing and/or to another application wherein it would be desired to determine the amplitude of the pseudo-sinusoidal deformations of at least an area 6 of the fixed race 1.

According to the invention, the bearing comprises at least a system for determining the amplitude A of the pseudo-sinusoidal deformations of an area 6 of the fixed race 1 which are induced during rotation, said system comprising three strain gauges 7.

The gauges 7 are each capable of delivering a signal depending on the deformation it sustains. As shown in FIG. 1, the gauges 7 are equally distributed over the area 6 along a line extending in the general rotation direction.

The determination system further comprises a system for measuring three signals $V_i$ respectively depending on the temporal variations of the signal emitted by each gauge 7 during rotation, with said device being capable of forming, through a combination of the three signals $V_i$, two signals SIN and COS respectively of like angle and like amplitude, said amplitude depending on A.

The amplitude A can be deduced from these two signals SIN and COS by calculating the expression $SIN^2+COS^2$, through a calculation device formed for example by a processor (not shown).

It is thus possible to get free from the delay or quality issues, which are inherent in the temporal determination of the deformations since the calculation of the amplitude is carried out independently from the rotation speed.

As regards FIGS. 2 to 5, four embodiments of a system of determination according to the invention are described, wherein the gauges 7 are based on resistive elements, more particularly, piezoresistive or magnetostrictive elements so as to have each an electric resistance $R_i$ which varies depending on the deformations sustained by said gauge 7. More particularly, the gauges 7 may include either a block of several resistances which are combined for obtaining an average resistance value which is representative of the resistance value at the level of the position of the block, i.e. only one resistance.

According to the embodiments shown, the measuring device comprises a current loop connection between the gauges 7 and a source of power i. The connection comprises a first stage of adjustable gain $G_i$ differential amplifiers 8. In addition, a measuring device may further comprise a stage for filtering the signals which is not shown.

Figure 2:
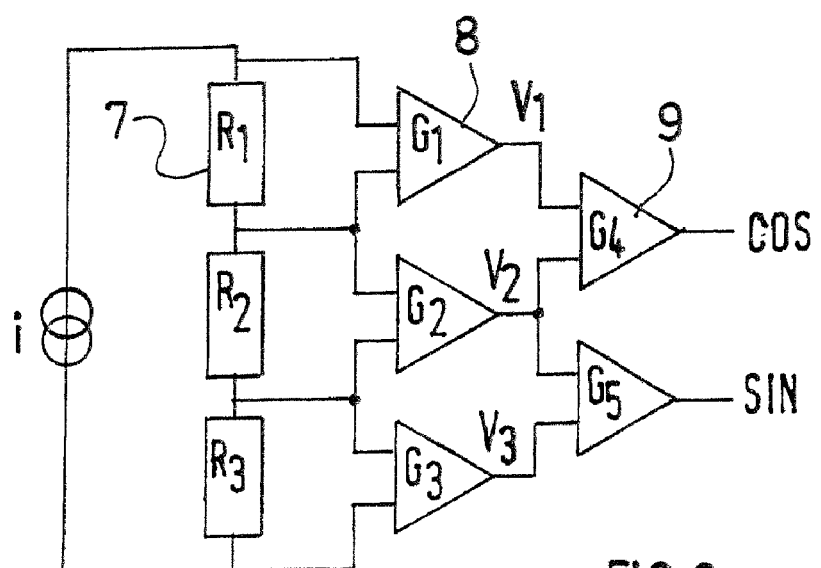
FIG. 2 is a block diagram of a first embodiment of a determination system according to the invention.

As regards FIG. 2, the first embodiment comprises three gauges 7 connected in series in the current loop and the first stage comprises three differential amplifiers 8 which deliver the following signals:

$$V_1 = G_1 \times (R_{01} + \Delta R_1 \sin(\omega t))i$$

$$V_2 = G_2 \times (R_{02} + \Delta R_2 \sin(\omega t + \phi))i$$

$$V_3 = G_3 \times (R_{03} + \Delta R_3 \sin(\omega t + 2\phi))i$$

with $R_{oi}$ being the values at rest of the resistances $R_i$, $\Delta R_i$ being the variations in the resistance of gauges 7, $\omega = 2\pi/T$ (T being the temporal period), $\phi$ being the spatial phase difference between the gauges 7, and i being the intensity of the current in the loop.

The sinusoidal characteristic (compared to time) of the sampled function is intended to simplify the following calculations, but it is not a limit. This hypothesis means that it is assumed that the bearing rotates at a constant speed ($\omega$ constant).

According to the embodiment shown in FIG. 2, the measuring device further comprises a second stage of differential amplifier 9 arranged to have the differences $V_1-V_2$ and $V_3-V_2$. It is possible to obtain the equality $G_1 \Delta R_1 = G_2 \Delta R_2 = G_3 \Delta R_3 = G \Delta R$, by adjusting the gains $G_1$, $G_2$, $G_3$.

In the particular case where $\phi = \pi/2$, i.e. when the gauges 7 are spaced by a distance equal to $\lambda/4$, the differences $V_1-V_2$ and $V_3-V_2$ can be written as follows:

$$V_1 - V_2 = [-\sqrt{2} G \Delta R \cos(\omega t + \pi/4)] \times i$$

$$V_3 - V_2 = [-\sqrt{2} G \Delta R \sin(\omega t + \pi/4)] \times i$$

Consequently, in this first embodiment, the measuring device makes it possible to obtain directly the signals $COS = V_1 - V_2$ and $SIN = V_3 - V_2$.

Thus, when calculating the expression $SIN^2 + COS^2$, $[\sqrt{2G\Delta R}]^2 \times i^2$ is obtained, which makes it possible at the output of the calculation device to obtain the amplitude A as a function of time, which depends on $\Delta R$.

Figure 3:
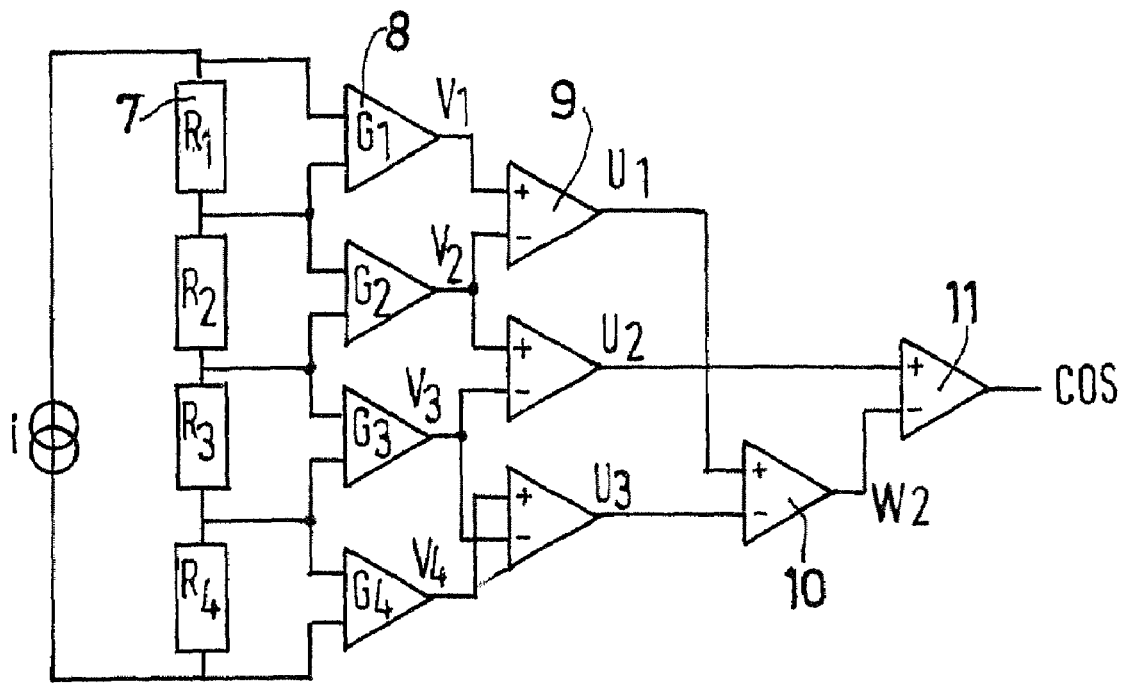
FIG. 3 is a partial block diagram of a second embodiment of a determination system according to the invention.
Figure 4:
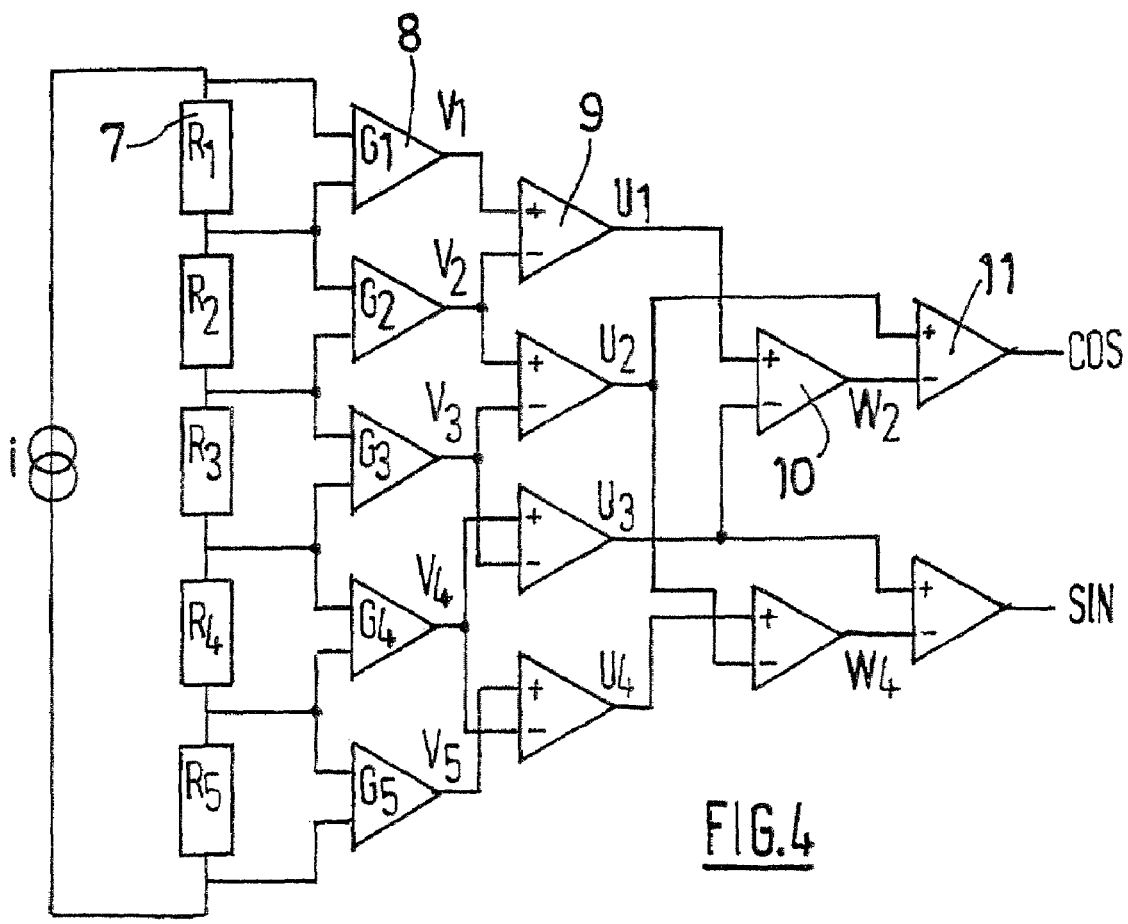
FIG. 4 is a block diagram of a third embodiment of a determination system according to the invention.
Figure 5:
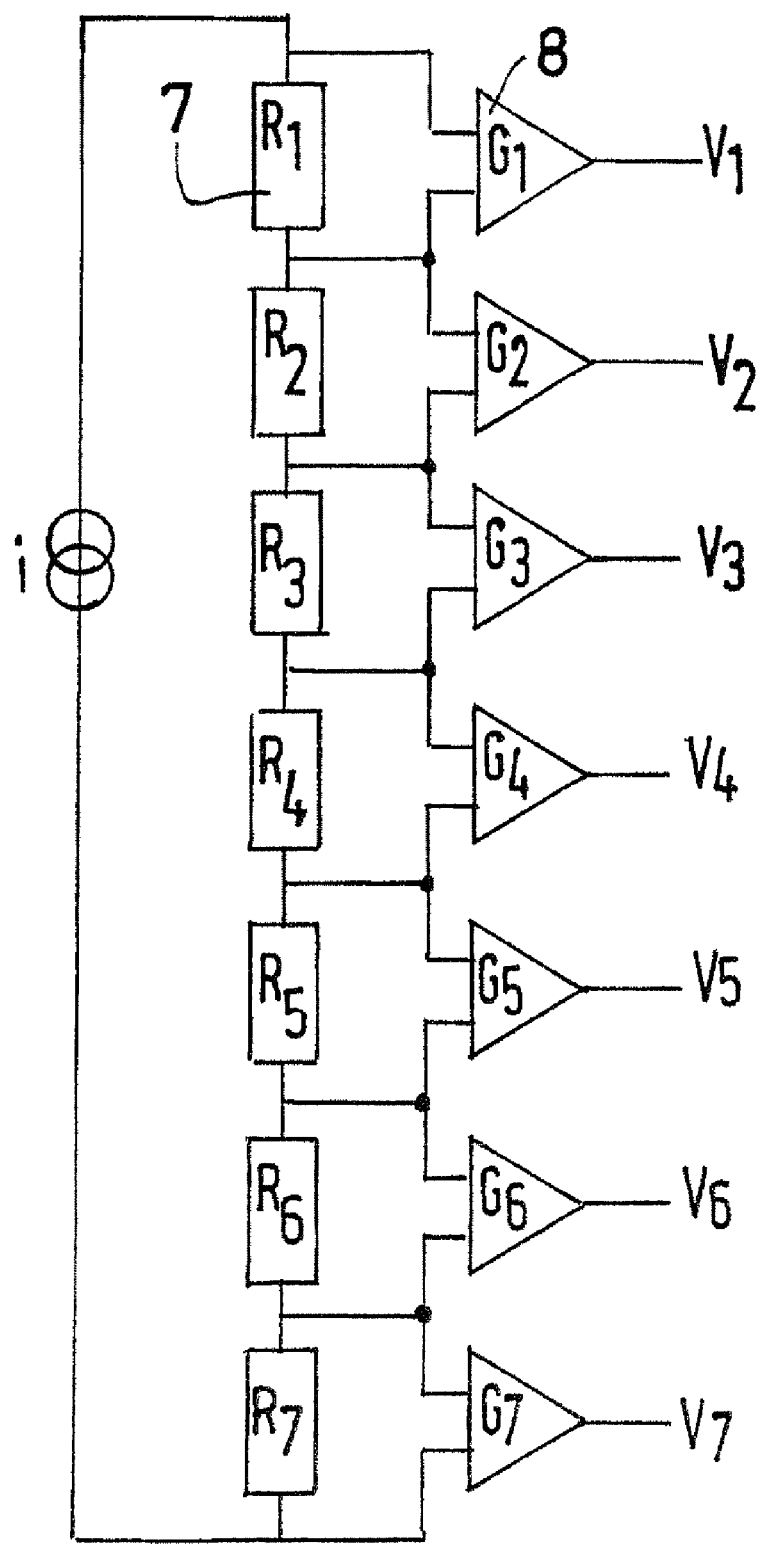
FIG. 5 is a block diagram of a fourth embodiment of a determination system according to the invention.

As regards FIGS. 3 to 5, three embodiments are described which make it possible, in addition, to get free, by means of a filtration, from the interference signals in the pseudo sinusoidal signal induced by the passage of the rolling bodies, more particularly the signals having a frequency depending on the rotation frequency such as the out-of-roundness signal or the excentration signal. Such embodiments provide a measuring device which makes it possible to obtain filtered signals SIN and COS so as to have less noise which enhances the accuracy in determining the amplitude of the pseudo-sinusoidal deformations.

In these three embodiments, the general structure of the bearing, the strain gauges 7, as well as the layout thereof on the bearing can be analogous to those described with reference to the first embodiment and more particularly while referring to FIG. 1.

While referring to FIG. 3, the second embodiment includes four strain gauges 7 delivering each a signal depending on the deformation sustained by said gauge. The gauges 7 are equally distributed over the area 6 with a spacing equal to $\lambda/4$. The current loop connection comprises the four gauges 7 connected in series and the first stage comprises four differential amplifiers 8 which deliver the signals:

$$V_1 = G_1[R_{01} + \Delta R_1 \sin(\omega_1 t) + \beta_1 \sin(\omega_2 t + \phi)]i$$

$$V_2 = G_2[R_{02} + \Delta R_2 \sin(\omega_1 t + \pi/2) + \beta_2 \sin(\omega_2 t + 2\phi)]i$$

$$V_3 = G_3[R_{03} + \Delta R_3 \sin(\omega_1 t + \pi) + \beta_3 \sin(\omega_2 t + 3\phi)]i$$

$$V_4 = G_4[R_{04} + \Delta R_4 \sin(\omega_1 t + 3\pi/2) + \beta_4 \sin(\omega_2 t + 4\phi)]i$$

wherein the interference signal has an amplitude $\beta$, a pulsation $\omega_2$ and a phase $\phi$ with respect to the signal induced by the rotation of the balls. More particularly, when the interference signal is the result of an out-of-roundness, the phase difference $\phi$ can be defined as follows in the case of a 14-ball bearing:

$$\phi = (\lambda \times 360)/(4 \times 7 \times \lambda) = 12.82° = \text{constant}$$

The measuring device further comprises a second stage comprising three differential amplifiers 9, which makes it possible to eliminate the continuous component by subtracting the signals $V_i$ and forming the following signals:

$$U_1 = V_1 - V_2 = [-\sqrt{2} G \Delta R \cos(\omega_1 t + \pi/4) - 2\beta \sin(\phi/2) \cos(\omega_2 t + 3\phi/2)] \times i$$

$$U_2 = V_2 - V_3 = [-\sqrt{2} G \Delta R \cos(\omega_1 t + 3\pi/4) - 2\beta \sin(\phi/2) \cos(\omega_2 t + 5\phi/2)] \times i$$

$$U_3 = V_4 - V_3 = [-\sqrt{2} G \Delta R \cos(\omega_1 t + \pi/4) - 2\beta \sin(\phi/2) \cos(\omega_2 t + 7\phi/2)] \times i$$

with $G_1 \beta_1 = G_2 \beta_2 = G_3 \beta_3 = G_4 \beta_4 = \beta$

The measuring device further comprises a third and a fourth stages of differential amplifiers. The third stage comprises a differential amplifier 10 which combines the signals $U_1$ and $U_3$ from the second stage to form the signal:

$$W_1 = U_1 - U_3 = [-4\beta \sin(\phi/2) \cos(\phi) \cos(\omega_2 t + 5\phi/2)] \times i$$

i.e. by adjusting the gain of the amplifier 10 of the third stage, the following signal is obtained:

$$W_2 = 1/(2 \cos \phi) W_1 = [-2\beta \sin(\phi/2) \cos(\omega_2 t + 5\phi/2)] \times i$$

The fourth stage comprises an amplifier 11 combining the signal $W_2$ from the third stage and the signal $U_2$ from the second stage in order to deliver the following signal COS:

$$COS = U_2 - W_2 = [-\sqrt{2} G \Delta R \cos(\omega_1 t + 3\pi/4)] \times i$$

As for the signal SIN, it can be obtained according to one of the three following solutions:

$$SIN = \frac{1}{2} * (U_1 + U_3) = [-\sqrt{2} G \Delta R \sin(\omega_1 t + 3\pi/4) - 2\beta \sin(\phi/2) \sin(\phi) \sin(\omega_2 t + 5\phi/2)] \times i$$

or $$SIN = U_3$$

or $$SIN = U_1.$$

However, these three combinations do not make it possible to obtain a perfect signal SIN since it is disturbed by the interference frequency $\omega_2$. However, the thus determined amplitude A of the deformation has an error which can be considered as acceptable in some applications.

The third and fourth embodiments described hereunder with respect to FIGS. 4 and 5 respectively, make it possible to obtain a signal SIN without any interference.

As regards FIG. 4, the third embodiment comprises five strain gauges 7 each delivering a signal depending on the deformation sustained by said gauge. The gauges 7 are equally distributed over the area 6 with a spacing equal to $\lambda/4$. The current loop connection comprises the five gauges 7 connected in series and the first stage comprises five differential amplifiers 8, which deliver the signals:

$$V_1 = G_1[R_{01} + \Delta R_1 \sin(\omega_1 t) + \beta_1 \sin(\omega_2 t + \phi)]i$$

$$V_2 = G_2[R_{02} + \Delta R_2 \sin(\omega_1 t + \pi/2) + \beta_2 \sin(\omega_2 t + 2\phi)]i$$

$$V_3 = G_3[R_{03} + \Delta R_3 \sin(\omega_1 t + \pi) + \beta_3 \sin(\omega_2 t + 3\phi)]i$$

$$V_4 = G_4[R_{04} + \Delta R_4 \sin(\omega_1 t + 3\pi/2) + \beta_4 \sin(\omega_2 t + 4\phi)]i$$

$$V_5 = G_5[R_{05} + \Delta R_5 \sin(\omega_1 t + \pi) + \beta_5 \sin(\omega_2 t + 5\phi)]i$$

wherein the interference signal has an amplitude $\beta$, a pulsation $\omega_2$ and a phase $\phi$ with respect to the signal induced by the rotation of balls.

The measuring device further comprises a second stage comprising four differential amplifiers 9, which makes it possible to eliminate the continuous component by subtracting the signals $V_i$ and forming the following signals:

$$U_1 = V_1 - V_2 = [-\sqrt{2}G\Delta R \cos(\omega_1 t + \pi/4) - 2\beta \sin(\phi/2)\cos(\omega_2 t + 3\phi/2)] \times i$$

$$U_2 = V_2 - V_3 = [-\sqrt{2}G\Delta R \cos(\omega_1 t + 3\pi/4) - 2\beta \sin(\phi/2)\cos(\omega_2 t + 5\phi/2)] \times i$$

$$U_3 = V_4 - V_3 = [-\sqrt{2}G\Delta R \cos(\omega_1 t + \pi/4) - 2\beta \sin(\phi/2)\cos(\omega_2 t + 7\phi/2)] \times i$$

$$U_4 = V_5 - V_4 = [-\sqrt{2}G\Delta R \cos(\omega_1 t + 3\pi/4) - 2\beta \sin(\phi/2)\cos(\omega_2 t + 9\phi/2)] \times i$$

The measuring device further comprises a third and a fourth stages of differential amplifiers. The third stage comprises two differential amplifiers 10, which combine the signals $U_1$ to $U_4$ from the second stage to form the signals:

$$W_1 = U_1 - U_3 = [-4\beta \sin(\phi/2)\cos(\phi)\cos(\omega_2 t + 5\phi/2)] \times i$$

$$W_3 = U_4 - U_2 = [-4\beta \sin(\phi/2)\cos(\phi)\cos(\omega_2 t + 7\phi/2)] \times i$$

i.e., when adjusting the gains of the amplifiers 10 of the third stage the following signals are obtained:

$$W_2 = 1/(2\cos\phi)W_1 = [-2\beta \sin(\phi/2)\cos(\omega_2 t + 5\phi/2)] \times i$$

$$W_4 = 1/(2\cos\phi)W_3 = [-2\beta \sin(\phi/2)\cos(\omega_2 t + 5\phi/2)] \times i$$

The fourth stage comprises two amplifiers 11 combining the signals $W_2$ and $W_4$ from the third stage and the signals $U_2$ and $U_3$ from the second stage respectively, in order to deliver the signals COS and SIN as follows:

$$COS = U_2 - W_2 = [-\sqrt{2}G\Delta R \cos(\omega_1 t + 3\pi/4)] \times i$$

$$SIN = U_3 - W_4 = [-\sqrt{2}G\Delta R \sin(\omega_1 t + 3\pi/4)] \times i$$

Consequently, in the third embodiment, the measuring device makes it possible to obtain directly filtered signals COS and SIN of like angle and like amplitude, said amplitude depending on A.

Thus, when calculating the expression $SIN^2 + COS^2$, $[\sqrt{2}G\Delta R]^2 \times i^2$ is obtained, which makes it possible at the output of the calculation device to obtain the amplitude A as a function of time, which depends on $\Delta R$.

With reference to FIG. 5, the fourth embodiment comprises seven strain gauges 7, each one delivering a signal depending on the deformation sustained by said gauge. The gauges 7 are equally distributed over the area 6 with a spacing equal to $\lambda/8$.

The current loop connection comprises the seven gauges 7 connected in series and the first stage includes seven differential amplifiers 8, which deliver the following signals:

$$V_1 = G_1[R_{01} + \Delta R_1 \sin(\omega_1 t) + \beta_1 \sin(\omega_2 t + \phi)]i$$

$$V_2 = G_2[R_{02} + \Delta R_2 \sin(\omega_1 t + \pi/2) + \beta_2 \sin(\omega_2 t + 3\phi/2)]i$$

$$V_3 = G_3[R_{03} + \Delta R_3 \sin(\omega_1 t + \pi) + \beta_3 \sin(\omega_2 t + 2\phi)]i$$

$$V_4 = G_4[R_{04} + \Delta R_4 \sin(\omega_1 t + 3\pi/2) + \beta_4 \sin(\omega_2 t + 5\phi/2)]i$$

$$V_5 = G_5[R_{05} + \Delta R_5 \sin(\omega_1 t + \pi) + \beta_5 \sin(\omega_2 t + 3\phi)]i$$

$$V_6 = G_6[R_{06} + \Delta R_6 \sin(\omega_1 t + \pi) + \beta_6 \sin(\omega_2 t + 7\phi/2)]i$$

$$V_7 = G_7[R_{05} + \Delta R_7 \sin(\omega_1 t + \pi) + \beta_7 \sin(\omega_2 t + 4\phi)]i$$

wherein the interference signal has an amplitude $\beta$, a pulsation $\omega_2$ and a phase $\phi$ with respect to the signal induced by the rotation of balls.

The measuring device further comprises a second stage comprising six differential amplifiers (not shown), which makes it possible to eliminate the continuous component by subtracting signals $V_i$ by forming the following signals:

$$U_1 = V_1 - V_2 = [-2G\Delta R \cos(\omega_1 t + \pi/8)\sin(\pi/8) - 2\beta \sin(\phi/4)\cos(\omega_2 t + 5\phi/4)] \times i$$

$$U_2 = V_2 - V_3 = [-2G\Delta R \cos(\omega_1 t + 3\pi/8)\sin(\pi/8) - 2\beta \sin(\phi/4)\cos(\omega_2 t + 7\phi/4)] \times i$$

$$U_3 = V_3 - V_4 = [-2G\Delta R \cos(\omega_1 t + 5\pi/8)\sin(\pi/8) - 2\beta \sin(\phi/4)\cos(\omega_2 t + 9\phi/4)] \times i$$

$$U_4 = V_4 - V_5 = [-2G\Delta R \cos(\omega_1 t + 7\pi/8)\sin(\pi/8) - 2\beta \sin(\phi/4)\cos(\omega_2 t + 11\phi/4)] \times i$$

$$U_5 = V_5 - V_6 = [-2G\Delta R \cos(\omega_1 t + 9\pi/8)\sin(\pi/8) - 2\beta \sin(\phi/4)\cos(\omega_2 t + 13\phi/4)] \times i$$

$$U_6 = V_6 - V_7 = [-2G\Delta R \cos(\omega_1 t + 11\pi/8)\sin(\pi/8) - 2\beta \sin(\phi/4)\cos(\omega_2 t + 15\phi/4)] \times i$$

The measuring device further comprises a third, a fourth and a fifth stages of differential amplifiers (not shown).

The third stage includes three differential amplifiers, which combine signals $U_i$ from the second stage to form the signals:

$$W_1 = U_2 + U_6 = [-4\beta \sin(\phi/4)\cos(\phi)\cos(\omega_2 t + 11\phi/4)] \times i$$

$$W_3 = U_1 + U_5 = [-4\beta \sin(\phi/4)\cos(\phi)\cos(\omega_2 t + 9\phi/4)] \times i$$

$$W_5 = U_1 + U_2 + U_5 + U_6 = [-4\beta \sin(\phi/2)\cos(\phi)\cos(\omega_2 t + 5\phi/2)] \times i$$

i.e., by adjusting the gains of the amplifiers of the third stage, the following signals are obtained:

$$W_2 = 1/(2\cos\phi)W_1 = [-2\beta \sin(\phi/2)\cos(\omega_2 t + 11\phi/4)] \times i$$

$$W_4 = 1/(2\cos\phi)W_3 = [-2\beta \sin(\phi/2)\cos(\omega_2 t + 9\phi/4)] \times i$$

$$W_6 = 1/(2\cos\phi)W_1 = [-2\beta \sin(\phi/2)\cos(\omega_2 t + 5\phi/2)] \times i$$

The fourth stage includes three amplifiers combining the signals $W_i$ from the third stage and the signals $U_i$ from the second stage respectively, in order to deliver the following signals:

$$X_1 = U_4 - W_2 = [-2G\Delta R \sin(\pi/8)\cos(\omega_1 t + 7\pi/8)] \times i$$

$$X_2 = U_3 - W_4 = [-2G\Delta R \sin(\pi/8)\cos(\omega_1 t + 5\pi/8)] \times i$$

$$X_3 = U_3 + U_4 - W_6 = [-2G\Delta R \cos(\omega_1 t + 3\pi/4)] \times i$$

Consequently, the fourth stage delivers the signal COS by adjusting the gain of the corresponding differential amplifier:

$$COS = -1\sqrt{2} \cdot X_3 = [G\Delta R \cos(\omega_1 t + 3\pi/4)] \times i$$

A fifth stage comprising an amplifier is provided for delivering the signal SIN by combining the signals from the fourth stage and adjusting the gain of said amplifier according to the following formula:

$$SIN = 1/(4 \sin^2(\pi/8)) \cdot (X1 - X2) = [G\Delta R \sin(\omega_1 t + 3\pi/4)] \times i$$

Consequently, in this fourth embodiment, the measuring device makes it possible to obtain directly filtered signals COS and SIN, of like angle and like amplitude, said amplitude depending on A.

Thus, when calculating the expression $SIN^2 + COS^2$, $[G\Delta R]^2 \times i^2$ is obtained, which makes it possible, at the output of the calculation device to obtain the amplitude A as a function of time, which depends on $\Delta R$.

While referring to FIG. 1, the arrangement of the bearing is described and shown wherein the gauges 7 are positioned on a substrate 12 which is fixed on the deformation area 6 of the fixed race 1. The substrate 12 is rigidly fixed to the fixed race 1, for example by gluing or welding so that it also has the function of transmitting the deformations between the fixed race 1 and the gauges 7.

All the gauges 7 described hereabove are based on resistive elements, other gauges 7, for example sensors selected among surface acoustic wave sensors and magnetic field sensors can be used within the scope of the present invention, provided they deliver a signal depending on a deformation. More particularly, the magnetic field sensors can be based on sensitive elements of the magneto resistance, giant magneto resistance, or Hall effect, magneto resistance with a tunnel effect or magnetostrictive layers types.

In the embodiment shown, the gauges 7 are screen printed in a thick layer on the substrate 12, for example made of ceramic. More particularly, a technology of the hybrid circuit type makes it possible to integrate the measuring device and the calculation device on the substrate 12. Besides, screen printing makes it possible to have a correct adjustment of the value of resistances as well as a correct sensitivity to deformation while providing a precise positioning of resistances on the substrate 12.

The deformation area 6 is machined so as to be substantially plane and extending above two rows of balls. In this embodiment, the gauges 7 are not equally distributed on the raceway, so that the amplitude of the measured deformation depends on the considered gauge 7.

It can be provided that the gauges 7 are directly fixed on the curved surface of the fixed race 1, for example, the gauges 7 can be of the pellicular frame type, which makes it possible to equalise, during the construction, all the distances between the gauges 7 and the raceway.

In the embodiment shown in FIG. 1, the gauges 7 of two determination systems are integrated on the same substrate 12 so that, in the vicinity of each raceway, at least one determination system is provided to determine the amplitude of the deformation of area 6.

More particularly, the gauges 7 are positioned on the outer periphery of the fixed race 1, substantially opposite each of the raceways so as to increase the intensity of the signals to be measured. Thus, the substrate 12 carrying the gauges 7 makes it possible to determine the amplitude of the deformations induced, respectively, by substantially a row of balls, and in the same axial plane.

The bearing may also include at least three (eight in the embodiment shown in FIG. 1: four visible ones and four positioned symmetrically at the back of the bearing) systems for determining the amplitude of the deformations of respectively an area 6 of the fixed race 1, said systems being connected or intended to be connected to a calculator capable of calculating, depending on the amplitudes determined, the stresses applied during rotation on the fixed race and/or on an element integral with the rotating race. More particularly, such a calculator is described in document FR-2 839 553 delivered to the applicant.

The invention claimed is:

1. A bearing comprising a fixed race, a rotating race and at least a row of rolling bodies positioned in a raceway which is formed between said races so as to allow their relative rotation, said rolling bodies being equally distributed in the raceway with an angular separation $\lambda$, said bearing comprising at least a system for determining the amplitude A of the pseudo-sinusoidal deformations of an area of the fixed race that are induced during rotation, said bearing being characterised in that the determination system includes:

three strain gauges, each delivering a signal depending on the deformation sustained by said gauge, said gauges being equally distributed on said area with a spacing equal to $\lambda/4$;

a device for measuring three signals $V_i$ which depend respectively on the temporal variations of the signal emitted by each gauge during rotation, said device being able to form, through a combination of the three signals $V_i$, two signals SIN and COS respectively of like angle and like amplitude, said amplitude depending on A;

a device for calculating the amplitude A of the deformations of the area as a function of time, said device being designed to calculate the expression $SIN^2 + COS^2$ so as to deduce the amplitude A therefrom.

2. A bearing according to claim 1, wherein the gauges are based on resistive elements so as to have each an electric resistance $R_i$ which varies depending on the deformations sustained by said gauge.

3. A bearing according to claim 2, characterised in that the measuring device comprises a current loop connection between the three gauges, said connection comprising a first stage of three adjustable gain $G_i$ differential amplifiers.

4. A bearing according to claim 3, characterised in that the measuring device further comprises a second stage of differential amplifiers which are connected to have the differences $V_1 - V_2 = COS$ and $V_3 - V_2 = SIN$.

5. A bearing according to claim 3, characterised in that it comprises a fourth strain gauge delivering a signal depending on the deformation sustained by such gauge, said gauge being spaced by a distance equal to $\lambda/4$ from one of said three other gauges, the current loop connection comprising said fourth gauge and a fourth adjustable gain $G_i$ differential amplifier in the first stage to deliver four signals $V_i$ which are respectively depending on the temporal variations of the signal emitted by each gauge during rotation, wherein the measuring device further comprises a second stage of differential amplifiers comprising three differential amplifiers which are connected to have the differences $V_1 - V_2$, $V_2 - V_3$ and $V_4 - V_3$, with at least a third stage of differential amplifiers being provided for delivering the signals SIN and COS through a combination of the three signals from the second stage.

6. A bearing according to claim 5, characterised in that it includes a fifth strain gauge delivering a signal depending on the deformation sustained by said gauge, said gauge being spaced by a distance equal to $\lambda/4$ from one of the four other gauges, the current loop connection comprising said fifth gauge and a fifth adjustable gain $G_i$ differential amplifier (8) in the first stage to deliver five signals $V_i$ which depend respectively on temporal variations of the signal emitted by each gauge during rotation, wherein the measuring device further comprises a second stage of differential amplifiers comprising four differential amplifiers which are connected to have the differences $V_1-V_2$, $V_2-V_3$, $V_4-V_3$ and $V_5-V_4$, with at least a third stage of differential amplifiers being provided for delivering the signals SIN and COS through a combination of the four signals from the second stage.

7. A bearing according to claim 5, characterised in that it includes three additional strain gauges delivering a signal depending on the deformation sustained by said gauge, said additional gauges being interposed between the four other gauges so as to form a set of seven gauges equally distributed over the area with a spacing equal to $\lambda/8$, the current loop connection comprising said set of gauges and seven adjustable gain $G_i$ differential amplifiers in the first stage to deliver seven signals $V_i$ which respectively depend on the temporal variations of the signal emitted by each gauge during rotation, wherein the measuring device further comprises a second stage of differential amplifiers comprising six differential amplifiers which are connected to have the differences $V_1-V_2$, $V_2-V_3$, $V_3-V_4$, $V_4-V_5$, $V_5-V_6$ and $V_6-V_7$, with at least a third stage of differential amplifiers being provided for delivering the signals SIN and COS through a combination of the six signals from the second stage.

8. A bearing according to claim 5 or 6, characterised in that the measuring device comprises a third and a fourth stages of differential amplifiers, the third stage combining the signals from the second stage and the fourth stage combining the signals from the second and/or third stages so as to deliver filtered signals SIN and COS.

9. A bearing according to claim 7, characterised in that the measuring device comprises a third, a fourth and a fifth stages of differential amplifiers, with the third stage combining the signals from the second stage, the fourth stage combining the signals from the second and third stages and the fifth stage combining the signals from the fourth stage so as to deliver filtered signals SIN and COS.

10. A bearing according to any one of claims 5 or 6, characterised in that at least one differential amplifier of at least one stage has an adjustable gain.

11. A bearing according to claim 1, characterised in that the gauges are positioned on a substrate which is fixed on the area of deformation of the fixed race.

12. A bearing according to claim 1, characterised in that the gauges are positioned on the area along a line, which extends in the general rotation direction.

13. A bearing according to claim 1, characterised in that the gauges are positioned on the outer periphery of the fixed race, substantially opposite the raceway.

14. A bearing according to claim 11, characterised in that the gauges are positioned on the area along a line, which extends in the general rotation direction.

15. A bearing according to claim 11, characterised in that the gauges are positioned on the outer periphery of the fixed race, substantially opposite the raceway.

16. A bearing according to claim 12, characterised in that the gauges are positioned on the outer periphery of the fixed race, substantially opposite the raceway.

* * * * *